United States Patent [19]
Asada

[11] Patent Number: 5,793,006
[45] Date of Patent: Aug. 11, 1998

[54] COLLISION DETECTION DEVICE AND MANUFACTURING METHOD OF THE SAME

[75] Inventor: Satoshi Asada, Tokyo, Japan

[73] Assignee: Mitsubishi Denki Kabushiki Kaisha, Tokyo, Japan

[21] Appl. No.: 608,061

[22] Filed: Feb. 28, 1996

[30]   Foreign Application Priority Data

Sep. 8, 1995  [JP]  Japan ................. 7-231422

[51] Int. Cl.⁶ ..................................................... H01H 35/14
[52] U.S. Cl. ............................................................ 200/61.53
[58] Field of Search ................... 200/61.45 R–61.45 M; 73/1.37, 1.38, 1.39, 488, 514.01; 307/119–121

[56]   References Cited

U.S. PATENT DOCUMENTS

| | | | |
|---|---|---|---|
| 3,571,539 | 3/1971 | Kaiser | 200/61.53 |
| 3,715,535 | 2/1973 | Urenda | 200/61.53 |
| 3,765,699 | 10/1973 | Marquardt et al. | 280/150 AB |
| 4,210,789 | 7/1980 | Ushiku et al. | 200/61.45 R |
| 5,192,838 | 3/1993 | Breed et al. | 200/61.45 R |
| 5,304,756 | 4/1994 | Shimozono et al. | 200/61.45 M |
| 5,306,883 | 4/1994 | Manandhar et al. | 200/61.53 |
| 5,373,126 | 12/1994 | Manandhar et al. | 200/61.53 |
| 5,585,607 | 12/1996 | Kato et al. | 200/61.53 |

*Primary Examiner*—Michael L. Gellner
*Attorney, Agent, or Firm*—Sughrue, Mion, Zinn, Macpeak & Seas, PLLC

[57]   ABSTRACT

A weight (1), which is pressed toward the direction of collision detection by a force of a coil spring (3) so as to be displaced only at vehicle collision for functioning attached contactors to produce a collision detection signal, is slidably held on a shaft (2) which is processed to be lubricous and is secured between a first stopper (8) press-fitted to a base (9) and a second stopper (9b) of the base (9) that are formed as being separated members, thereby allowing the collision detection device to provide ensured operation with few errors and good response.

11 Claims, 6 Drawing Sheets

SET LENGTH

COLLISION DETECTION DEVICE AND MANUFACTURING METHOD OF THE SAME

BACKGROUND OF THE INVENTION

The present invention relates to a collision detection device which detects collision of vehicles or the like and initiates operation of a passive safety device such as an air bag system, and to its manufacturing method.

Various kinds of collision detection devices have been known which detect collision of vehicles and output electric signals to air bag system or the like for initiating their operation.

Figure 11:
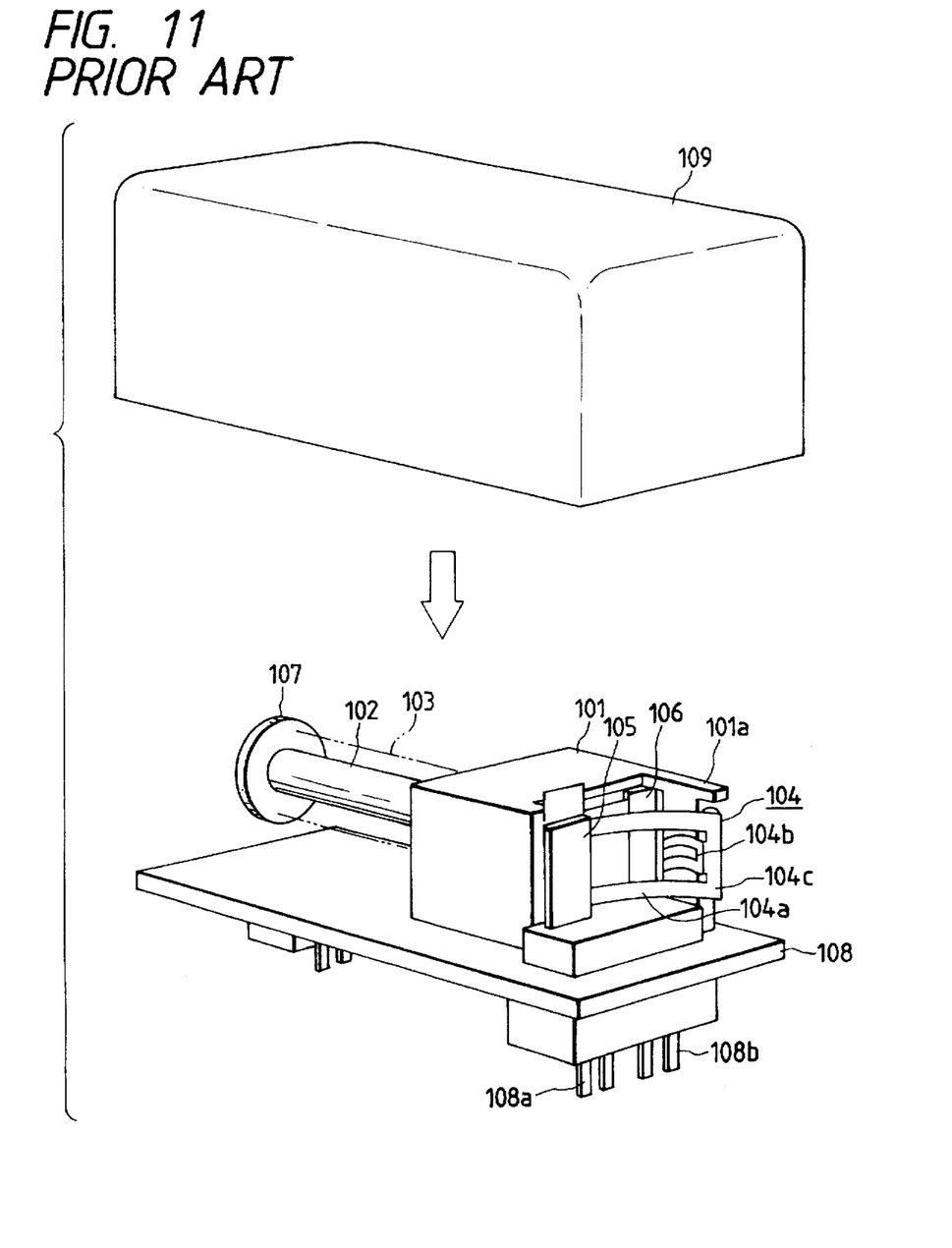
FIG. 11 is a perspective view illustrating a conventional collision detecting device.

FIG. 11 is a perspective view illustrating a generally used conventional collision detecting device. In this figure, reference numeral 101 designates a weight with a predetermined mass and reference numeral 102 indicates a shaft which determines the displacement of the weight 101 in the direction of the axis of the shaft and slidably supports the weight 101. The weight 101 is pressed in one direction by a coil spring 103 which is shown with chain lines in the figure. Reference numeral 104 designates a movable contactor which is displaced to be deformed in following the displacement of the weight 101 and reference numeral 105 indicates a bonded side terminal which is bonded to the movable contactor 104 for taking out an electric signal. Reference numeral 106 designates a fixed contactor which contacts to the movable contactor 104 to provide a conductive state for taking out an electric signal by displacing with the weight 101 when the weight 101 is displaced by a predetermined distance against the pressing force of the coil spring 103. The displacement of the weight 101 is limited by a stopper 107 which is fixed to the shaft 102 with screws and holds the coil spring 103 at the one end of the shaft 102.

The shaft 102 is formed as a part of a one-piece molded base 108 to which the bonded side terminal 105 and the fixed contactor are secured together with terminals 108a and 108b provided for outputting signals. The terminals 108a is connected to the movable contactor 104 and the terminals 108b is connected to the fixed contactor 106. A cover 109 is provided to form a case of the device together with the base 108 in order to protect dusts entering into the device.

The collision detection device is attached to a vehicle so that the stopper 107 is positioned on the front side of the vehicle in order to detect collision of a running vehicle against an obstacle in the travelling direction such as a preceding vehicle. Thus, the device is well mounted by positioning the stopper 107 on a side where the collision detection is needed.

The operation of the device will be explained below. When a body of a vehicle is largely decelerated by suffering collision, the weight 101 is also decelerated to receive an inertial force which, on overcoming an elastic force of the coil spring 103, displaces the weight 101 to slide on the shaft toward the stopper 107 while compressing the coil spring 103.

In a normal state without collision, the weight 101 is being pressed on the side opposite to the stopper 107 by the elastic force of the coil spring 103, so that a support 101a protruded from the weight 101 butts a top end portion 104c of the movable contactor 104 to bend a beam portions 104a which function as leaf springs whose resilient force presses the movable contactor 104 against the support 101a. When the weight 101 is displaced, the movable contactor 104 follows the displacement to be elastically deformed in the direction of reducing the bending of the beam portions 104a of the movable contactor 104. When the bending of the beam portions 104a is reduced to a certain amount, a contact 104b of the movable contactor 104 comes into contact with the fixed contactor 106 to make the bonded side terminal 105 and the fixed terminal 106 electrically continuous therebetween.

As described above, the shaft 102 in the conventional collision detecting device is integrally formed together with the base 108 as a one-piece molded product which is formed with a resin having large coefficient of friction, which results in giving large coefficient of friction to the shaft 102 to prevent the weight 101 from sliding smoothly. In addition, the shaft 102, being one-piece molded with the base 108 which is always shaken by a shaking vehicle, is readily suffer the shaking of vehicle transmitted through the base 108, which causes the detection to have errors or the shaft 102 easily to be worn.

Furthermore, the top end portion 104c of the movable contactor 104 butts the weight 101 with an as cut surface of a sheet metal which presents a difficulty in giving a prescribed precision to the dimension of the butted portion. This prevents the movable contactor 104 from a smooth engagement or disengagement to cause a shift in timing for turning on or turning off of the switch.

There has been further difficulty that a time from the initiation of deceleration due to a collision of a vehicle to the bonded side terminal 105 and the fixed contactor 106 becoming conductive (a time required for closing the contactors) and a time from the bonded side terminal 105 and the fixed contactor 106 becoming conductive to their becoming nonconductive (a time during the contactors are closed) can not be adjusted in accordance with characteristics of vehicles (such as shapes or rigidities) mounting the device.

SUMMARY OF THE INVENTION

A collision detecting device according to the present invention comprises a weight slidably supported in a direction of vehicle collision detection, a shaft for slidably supporting the weight, a first stopper for stopping the weight in sliding motion in the direction of vehicle collision detection and for supporting the one end of the shaft, a second stopper for stopping the weight in sliding motion in a direction opposite to the direction of vehicle collision detection and for supporting the other end of the shaft, an elastic member for providing a force acting on the weight in a direction opposite to the direction of vehicle collision detection, a movable contactor being displaced in contact with the weight by following sliding motion of the weight, a fixed contactor provided on the second stopper, and a base with the second stopper being integrally formed, wherein each of the first stopper and the second stopper is formed with a material different from a material of the shaft, and the shaft is held by the first stopper and the second stopper therebetween.

In the device, the first stopper is able to be secured at a plurality of positions on the base in the direction of vehicle collision detection.

Furthermore, the first stopper is press-fitted to a part of the base for being held.

The shaft is formed of a metal with a surface thereof being processed to be lubricous or a metal being lubricous in itself.

In addition, the shaft is insert molded in the base including the second stopper.

Moreover, the weight is provided with at least one cutaway portion on a side surface for adjusting mass of the weight.

The present invention further provides a collision detecting device comprising a weight slidably supported in a direction of vehicle collision detection, a shaft for slidably supporting the weight, a first stopper for stopping the weight in sliding motion in the direction of vehicle collision detection and for supporting the one end of the shaft, a second stopper for stopping the weight in sliding motion in a direction opposite to the direction of vehicle collision detection and for supporting the other end of the shaft, an elastic member for providing a force acting on the weight in a direction opposite to the direction of vehicle collision detection, a movable contactor being displaced in contact with the weight by following sliding motion of the weight, a fixed contactor provided on the second stopper, and a base with the second stopper being integrally formed, wherein the movable contactor contacts the weight with a contacting portion formed to have almost cylindrical shape.

With respect to a method of manufacturing the collision detecting device according to the present invention, the method comprises the step of selecting a shaft as being the shaft from a plurality of shafts with different axial lengths in assembling the device.

The method of manufacturing a collision detecting device also comprises the step of selecting an elastic member as being the elastic member from a plurality of elastic members with different elastic forces in assembling the device.

DETAILED DESCRIPTION OF THE PREFERRED EMBODIMENT

First Embodiment

Figure 1:
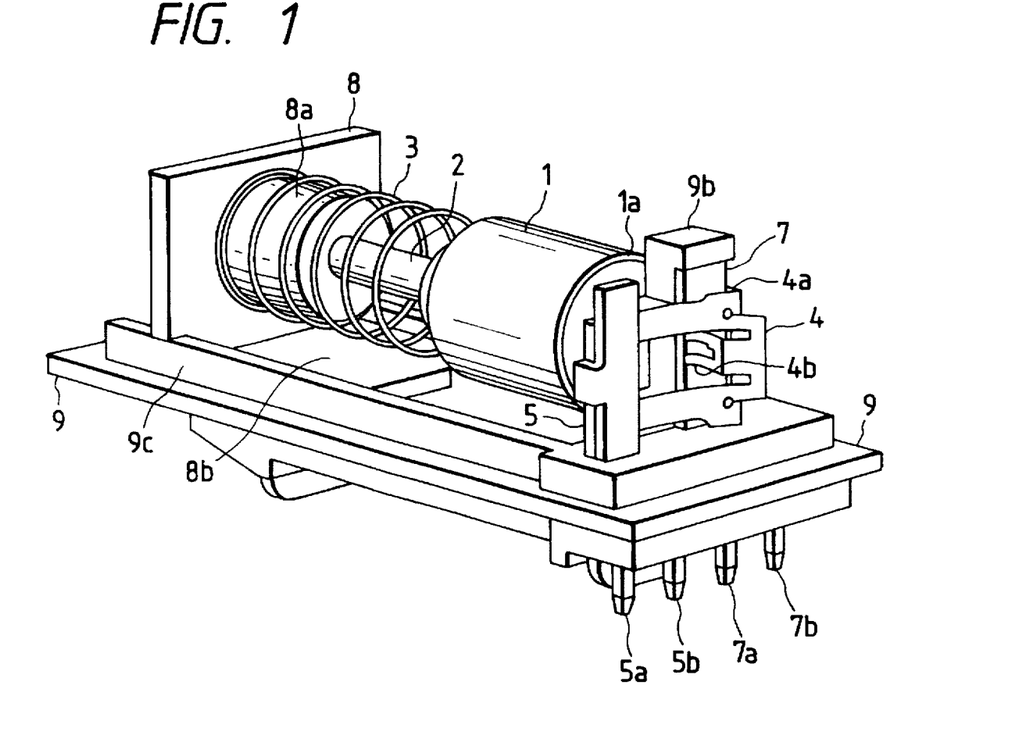
FIG. 1 is a perspective view illustrating a first embodiment according to the present invention.
Figure 2:
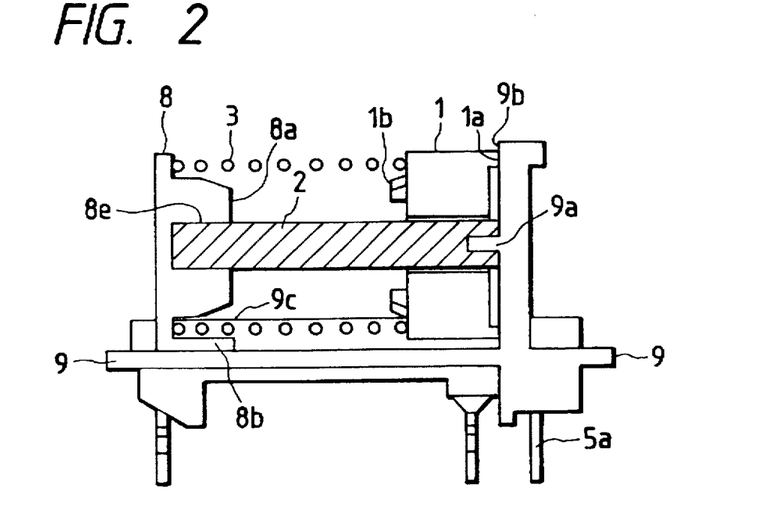
FIG. 2 is a partial cross sectional view showing the first embodiment according to the present invention.

FIG. 1 is a perspective view illustrating the first embodiment according to the present invention and FIG. 2 is a partial cross sectional view showing the first embodiment from which contactors are omitted to be illustrated.

In these figures, reference numeral 1 designates a cylindrical metal weight with a predetermined mass. The metal weight 1 has a protruded periphery 1a for preventing a support 4a (to be described later) of a movable contactor 4 from coming off the weight 1, and a butting portions 1b for absorbing an impact force acting when butting a first stopper 8 (to be described later). Reference numeral 2 indicates a shaft which penetrates through the center of the weight 1 for slidably supporting the weight 1 by determining its movement in the direction of the axis. The weight 1 is pressed in one direction (toward the movable contactor which will be described later) by a coil spring 3.

The movable contactor 4 is made of an L-shaped metal and is provided with a support portion 4a at one end which is displaced by following the displacement of the weight 1 and contacts 4b around the central region which follow the displacement of the support portion 4a and contact a fixed contact 7 at collision of a vehicle. The top of the contacts 4b are formed into two bends which ensure the contact with a fixed contactor 7. The other end of the movable contactor 4 is bonded to a bonded side terminal 5 by bonding means such as laser welding and is electrically connected to external equipments via terminals 5a and 5b protruded from under the device. The fixed contactor 7 is also connected to external equipments via terminals 7a and 7b which are electrically connected to the fixed contactor 7. Thus, the electric signal can be taken out from these terminals.

The first stopper 8 supports the one end of the coil spring 3, holds the one end of the shaft 2 with a hole 8e provided in a butting section 8a and limits the amount of movement of the weight 1 with the butting section 8a butting the weight 1.

Figure 3:
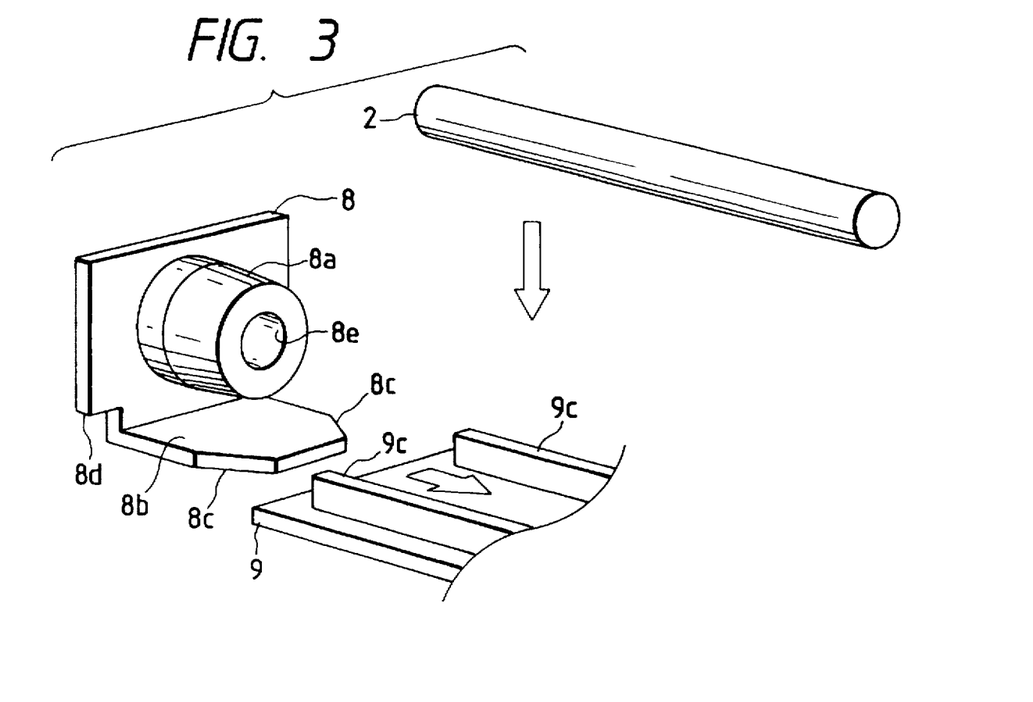
FIG. 3 is a perspective view showing a first stopper press-fitted to a base in the first embodiment according to the present invention.

Reference numeral 9 designates a base on which the bonded side terminal 5 and the fixed terminal 7 are secured. It also holds the other end of the shaft 2 by inserting a protrusion 9a into the shaft 2. One surface of the base 9 designated by reference numeral 9b is a second stopper which also limits the movement of the weight 1 by butting it. A pair of side walls 9c is provided in parallel as part of the base 9 in the direction of the axis of the shaft 2. Between the side walls 9c the first stopper 8 is moved in the direction of the arrow in the horizontal plane in FIG. 3 for being press-fitted and secured with a seat 8b as shown in FIG. 3.

The base 9, the protrusion 9a as a part thereof, the second stopper 9b and a pair of side walls 9c are one-piece molded with the fixed contactor 7, the bonded terminal 5 and terminals 7a, 7b, 5a and 5b thereof being attached prior to the molding.

The operation of thus assembled device will be explained below.

When a vehicle is normally running, the weight 1 is pressed on the side of the second stopper 9b by the elastic force of the coil spring 3, so that the support portion 4a in the movable contactor 4 is also pressed by the weight 1 to be bent and deformed from the L-shape with the contacts 4b separated from the fixed contactor 7 and brought to be out of contact. Then, in a state without deceleration due to collision, the bonded side terminal 5 and the fixed terminal 7 are not electrically connected and no current flows between terminals, by which the vehicle can be detected as being in normal state without collision.

At collision, the weight 1, which is held slidably in the direction of the collision, receives a force due to deceleration being larger than the elastic force of the coil spring 3 and moves toward the first stopper 8. This makes the bent movable contactor 4 follow the moving weight 1 in keeping butting by the elastic force due to bending and return to the initial L-shape with displaced contacts 4b contacted to the fixed contactor 7, so that the bonded side terminal 5 and the fixed terminal 7 are electrically connected. Thus, an electric signal current flows between the terminals at collision to be taken out for enabling the detection of the vehicle collision.

Here, the method of press-fitting the first stopper 8 to the base 9 is explained with reference to FIG. 3.

FIG. 3 is a partial perspective view showing the first stopper 8 before being press-fitted to the base 9. In the figure, the seat 8b of the first stopper 8 is press-fitted in the direction of the horizontal arrow between the side walls 9c of the base 9 with the shaft 2, the weight 1 and the coil spring 3 being temporarily assembled on the base 9. In this step, the press-fitting is performed with the bottom face of the seat 8b being kept in contact with the upper surface of the base 9 for ensuring the vertical positioning. Corners 8c are formed as being chamfered so as to facilitate the press-fitting. In carrying out the press-fitting, the one end of the shaft 2 is inserted into the hole 8e before it is press-fitted to the predetermined depth with a specially provided tool.

In FIG. 3, the seat 8b is secured without a member for holding it vertically, but it may be also possible to provide protrusions on the inner sides of the walls 9c on the base 9 for vertically securing the seat 8b between the protrusions and the upper surface of the base 9.

As described above, in the first embodiment, the ends of the shaft 2 are held and secured by different members which are secured with each other by press-fitting, so that the device can be easily assembled and securely fixed. Consequently, even under a severe condition of being on-vehicle which is violently shaken, this structure is able to reliably hold the movable weight 1 without interrupting the motion of the weight and the switching operation of the contactors, so that the collision of the vehicle can be reliably detected.

Here, the base having the second stopper, the shaft and the first stopper are formed as different members and assembled with the shaft being held by the first stopper and the second stopper. This structure provides advantages of being easily assembled as well as becoming highly rigid because the shaft is supported at the both ends.

Second Embodiment

The second embodiment of the present invention relates to improvements of the base 9 and the shaft 2 in the first embodiment which will be explained below. In FIG. 2, the base 9, the protrusion 9a as a part thereof, the second stopper 9b and side walls 9c are one-piece molded, and the shaft 2 is made of a metal with its section for slidably fitting the weight 1 being processed to be lubricous (for example, PTFE-coating or application of a lubricant) so as to provide well slidableness. This allows the shaft 2 and the weight 1 to slidably fit together with smallest possible clearance (a gap between the shaft 2 and the weight 1 being at most 0.2 mm). The shaft 2, like in the first embodiment, is held with the second stopper 9b on the base 9 and the first a stopper 8 press-fitted to the base 9.

Although the base 9 has a complicated shape together with the protrusion 9a, the second stopper 9b, the side walls 9c and other components, it can be inexpensively produced by one-piece molding of resin as explained above. The shaft 2, because of being made of a metal processed to be lubricous, has such an excellent rigidity and a good slidableness in fitting the weight 1 that it provides smooth movement of the weight 1 with resulting reliable switching operation that follows the movement of the weight 1. In addition, the clearance that can be made so small between the shaft 2 and the weight 1 reduces rattling of the weight 1 on the shaft 2, which is caused by shaking vehicle, to prevent jamming of the tilted weight 1, so that no malfunction or no shift in timing for turning on or off is caused in the switching operation.

Figure 12:
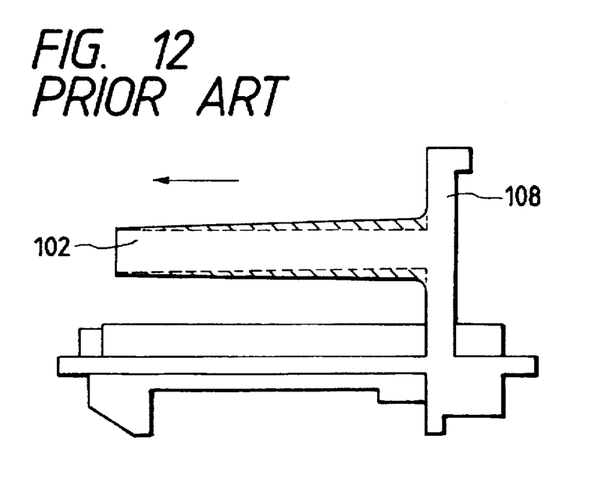
FIG. 12 is a partial cross sectional view illustrating a conventional collision detecting device.

A one-piece molded product having the shaft 2 and the base 9 formed together as in the conventional collision detection device had to provide a "draft" on its molded part as a part indicated by oblique hatching in FIG. 12 for facilitating removal of the molded product from a mold. The diameter of the shaft must therefore be reduced along the direction for removal. This resulted in nonuniform clearance between the weight 1 and the shaft 2 which caused jamming of the weight 1 on the shaft 2. In order to avoid such jamming, a little larger clearance had to be provided between the weight 1 and the shaft 2. In view of this, in this second embodiment according to the present invention, the base 9 and the shaft 2 are provided as separated parts so that a uniform clearance can be kept between the weight and the shaft for solving such a problem of causing jamming of the weight on the shaft.

Furthermore, the shaft, formed of a metallic material having a surface being processed to be lubricous, allows the weight to slide so easily on the shaft that the switching operation can be made reliable. Additionally, with a clearance for sliding (a gap between the weight and the slide) being minimized, rattling of the weight on the shaft (a vertical movement to the shaft 2) caused by shaking vehicle can be eliminated and no malfunction is presented in the switching operation.

Third Embodiment

Figure 4A:
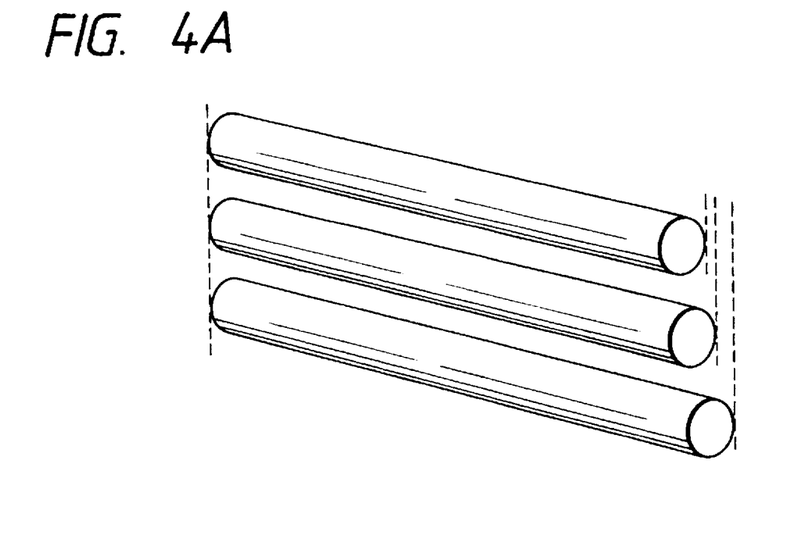
FIG. 4A shows shafts and FIG. 4B shows the coil springs in a third embodiment according to the present invention.
Figure 4B:
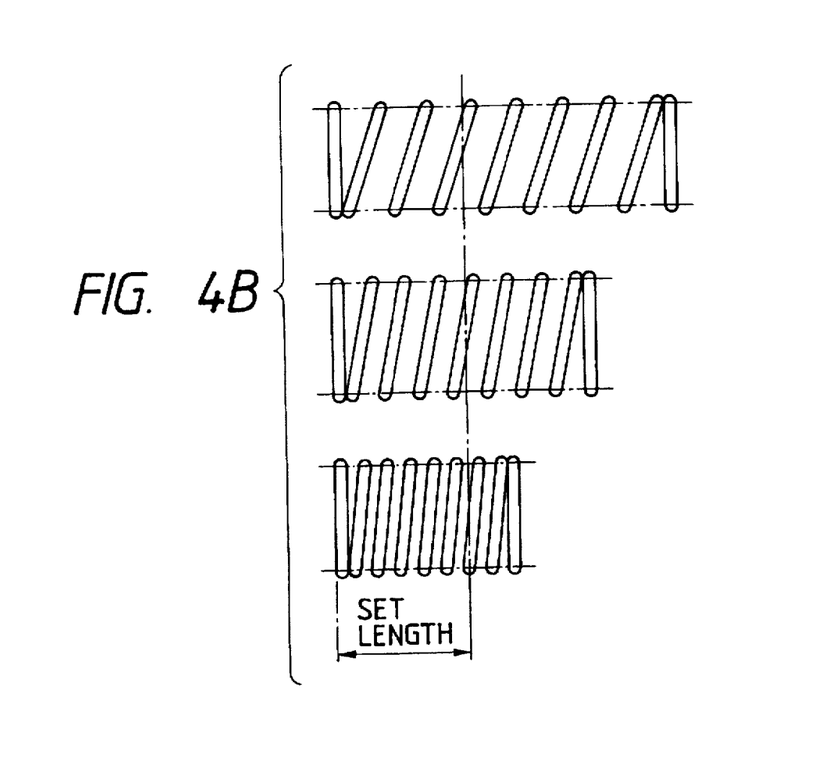

In the third embodiment, the shaft 2 in the above mentioned second embodiment is used as the one selected from a plurality kinds of shafts prepared with various lengths so as to satisfy the specification in assembling the device. FIG. 4a shows such shafts and FIG. 4b shows coil springs. In the figure, in accordance with the length of the selected shaft 2, the position of the first stopper 8 (namely, the position of the first stopper on the base in the direction of vehicle collision (the axial direction of the shaft)) press-fitted to the base 9 is adjusted at the time of the press-fitting by using specially provided press-fitting tool. The first stopper is thus capable of being freely placed at various positions on the base and surely secured there, so that the device can be assembled in accordance with any change in shaft length.

Here, a shaft providing variable length might be used as the shaft 2, but such a shaft may be less rigid and its moving part may prevent the shaft from being secured with enough reliability. Moreover, it may become expensive. Hence, in the third embodiment, the requirement for the shaft length in assembling the device is satisfied by using a shaft with a suitable length which is selected from a plurality kinds of shafts that are provided to have various lengths.

Similarly, the coil spring 3 can be properly used with its length being selected in accordance with the specification. Thus, the coil spring 3 is mounted so as to exert various forces in accordance with the selected lengths of the shaft 2 and the coil spring 3. Namely, as shown in FIG. 4b, the coil springs 3 provided with various lengths are assembled in the device with the same length (indicated as "set length" in the figure) unless the dimensions of other members are changed, and thus each of the coil springs exerts different force. Since the force of the coil spring 3 determines the motion of the weight 1 together with a force acting on the weight 1 due to the deceleration, various conditions can be determined by thus provided coil springs for turning on and off the switch that presents a signal of collision detection.

As described above, according to the third embodiment, the operating condition of the device can be finely adjusted with ease by changing the shaft 2 or the coil spring 3 in assembling the collision detection device. In addition, the length of the shaft, the mass of the weight or the force of the elastic member can be changed for easily providing various conditions of producing the collision detection signals with the conditions after the variations being kept in a reliable state.

In this third embodiment, no method of using screws was applied in changing the set length of the coil spring 3 in order to avoid variation in setting the operating condition in using a fine adjusting screw or deviation from the set point due to a loosened screw caused by shaking vehicle. The adjustment of condition in the third embodiment is thus carried out by changing members without providing any adjusting mechanism which tends to produce deviations caused by shaking, so that no malfunction is expected as being due to a trouble in such adjusting mechanism.

With respect to the coil spring 3, a plurality of coil springs with different spring constants can be provided for being selected in accordance with the specification. In this case, a force exerted onto the weight at the setting can be changed by selecting the coil spring 3 from those having various free lengths. Since the force of the coil spring 3 determines the motion of the weight 1 together with a force acting the weight 1 due to the deceleration, various conditions can be determined by thus provided coil springs for turning on and off the switch that presents a signal of collision detection.

In press-fitting the first stopper 8 to the base 9 in this third embodiment, the first stopper 8 is positioned on the base 9 with an adjusting operation. The positioning can be also performed in such way that both the base 9 and the first stopper 8 are formed to have a plurality of either protrusions or indentations both of which can be engaged with each other and the combination of the engaging protrusions and the indentations is changed so as to change the position of the first stopper 8 on the base 9. The protrusions and the indentations also function to prevent the first stopper from coming off the base.

Fourth Embodiment

Figure 5:
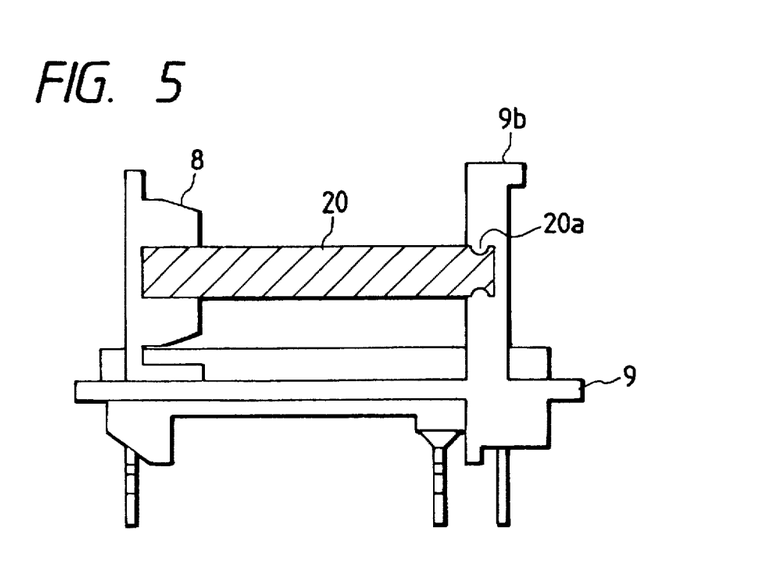
FIG. 5 is a cross sectional view showing a fourth embodiment according to the present invention.
Figure 6:
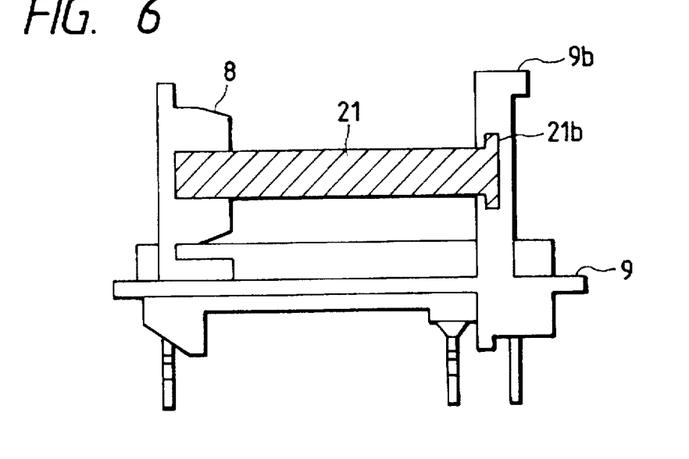
FIG. 6 is a cross sectional view showing a modification of the fourth embodiment according to the present invention.

In the forth embodiment, the shaft 2 in the second embodiment is insert molded in the second stopper 9b of the base 9. FIGS. 5 and 6 are cross sectional views showing the fourth embodiment. In these figures, reference numeral 20 designates a shaft which is insert molded into the second stopper 9b with a groove 20a provided at one end. Reference numeral 21 also indicates another kind of shaft which is insert molded into the second stopper 9b with a T-shaped portion 21b provided at one end. The other end of each of the shafts 20 and 21 is held by the first stopper 8.

Here, the insert molding is a method of molding for securing the shaft 20 or 21 with the base 9 by previously inserting the shaft at a predetermined position on the base 9 and molding the shaft together with the base 9 when the base is molded.

As described, each of the shafts 20 and 21 is formed to have an uneven portion such as the groove 20a or the T-shaped portion 21b at one end which functions as a stopper after being insert molded and prevents the shaft 20 or 21 from coming off. Being integrally molded with the base, the shaft also provides better rigidity when held by the first stopper 8 in assembling. The insert molding of the shaft is also able to facilitate assembling together with providing increased rigidity.

Fifth Embodiment

Figure 7:
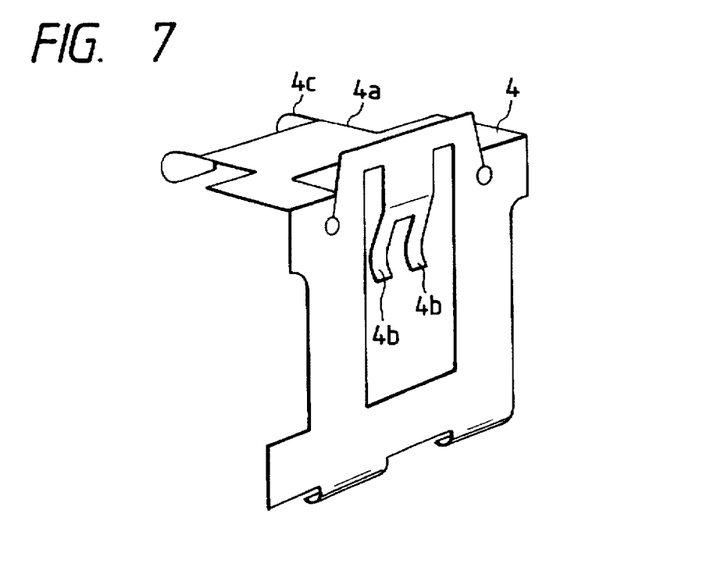
FIG. 7 is a perspective view showing a movable contactor in a fifth embodiment according to the present invention.
Figure 8:
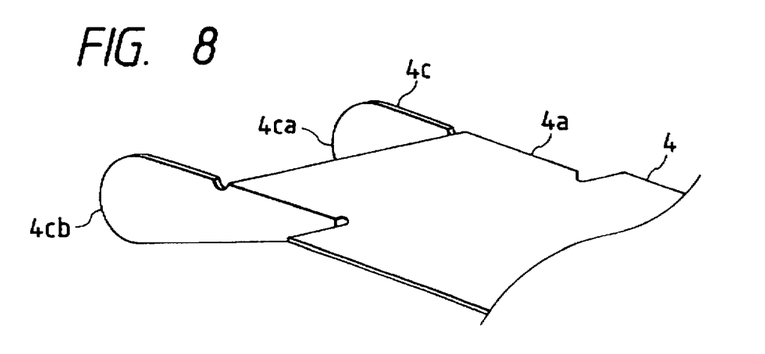
FIG. 8 is a perspective view showing a top end portion in the movable contactor in the fifth embodiment according to the present invention.
Figure 9:
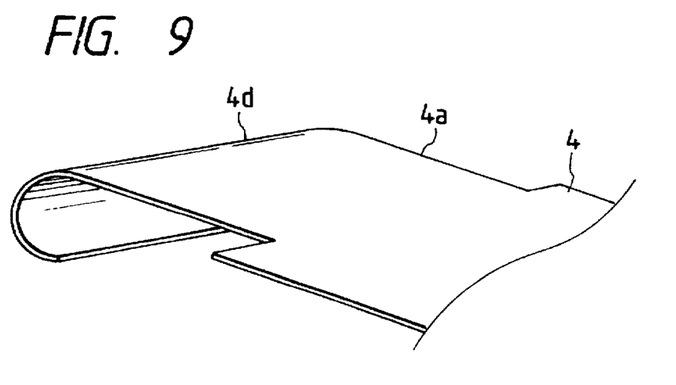
FIG. 9 is a perspective view showing a modification of the top end portion in the movable contactor in the fifth embodiment according to the present invention.

The fifth embodiment relates to the movable contactor 4 in the first embodiment. FIG. 7 is a perspective view showing the movable contactor 4 in the fifth embodiment. FIG. 8 is a perspective view showing a top end portion 4c of the support portion 4a in the movable contactor 4 in the fifth embodiment. FIG. 9 is a perspective view showing a modified top end portion 4d. In FIG. 9, the top end portion 4d is bent to have an almost cylindrical shape on the extension of the support portion 4a. The movable contactor 4 butts an end face of the weight 1 with the top end portion 4d at a point on the periphery of the cross section of the cylindrical shape. Thus, the movable contactor 4 contacts the weight 1 with a straight line along the cylindrically bent surface.

As mentioned, the movable contactor 4 can be in point contact with the weight 1 by means of the top end portion 4c as shown in FIG. 8, or, as in FIG. 9, can be in line contact with the weight 1 by means of the cylindrically bent top end portion 4d of the movable contactor 4 butting the weight 1. In comparison with these two ways of contact, the line contact provides smoother engagement and disengagement at the butting portion, so that little wear occurs at the contact portion with resulting little scattering in the timing of turning on and off of the contacts 4b which allows reliable operation thereof.

The top end portion 4c shown in FIG. 8 is formed to be in point contact with the weight 1 only at two points 4ca and 4cb. This may cause difficulty in adjusting contact condition when the top end portion 4c is formed by sheet metal working and variation in operating condition due to wearing of the contact points 4ca and 4cb. Despite of above shortcomings, the top end portion 4c has advantages of being formed with ease without requiring a bending process.

However, by considering the above shortcomings, the top end portion 4d of the movable contactor 4 in the fifth embodiment is bent so as to have a cylindrical shape so that the contact portion between the weight and the movable contactor is in line contact.

Sixth Embodiment

Figure 10:
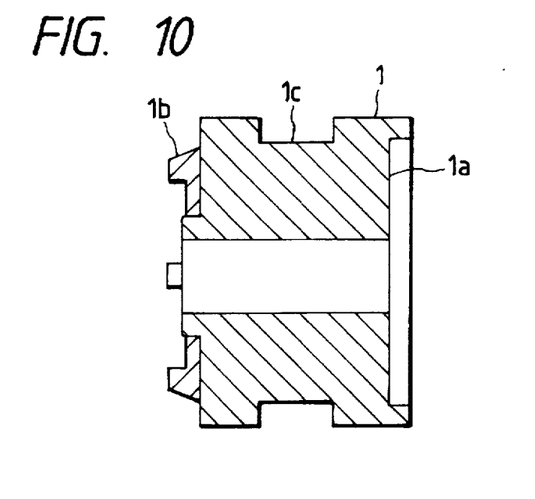
FIG. 10 is a cross sectional view showing a weight in a sixth embodiment according to the present invention.

The sixth embodiment relates to an improvement of the weight 1 in the first embodiment, a cross sectional view of which is shown by FIG. 10. In the figure, reference numeral 1a designates an end portion which forms a face that butts against the top end portion 4d of the movable contactor 4. A protrusion 1b is formed with a material such as a thermoplastic elastomer for absorbing vibrations due to collision and is stuck to the weight 1. Part of the peripheral surface of the cylindrical weight 1 is removed to provide at least one cutaway portion 1c whose size is depends on the required operating condition of the device.

As explained above, the mass of the weight 1 can be variously changed without affecting the contact condition with the movable contactor 4 by variously removing part of the peripheral surface of the cylindrical weight 1 in accordance with the specification. Namely, with the shaft, the stoppers and the contact portion between the movable contactor and the weight being left unchanged, the adjustment of the mass is carried out in other portions, or only the mass of the weight can be changed without changing other conditions.

This means that the various conditions for producing the collision detection signals, which depend on the relation between the force of the coil springs and the product of the deceleration and the mass, can be determined by merely changing the mass. By providing a plurality kinds of such weights 1, the various conditions for producing the collision detection signals can be previously determined without selecting the coil spring 3 or the shaft 1.

The mass of the weight 1 can be also changed by attaching additional weights, which are provided so as to fit in the cutaway portion 1c with various masses, by which the conditions for producing the collision detection signals can be easily changed.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A collision detecting device, comprising:

a weight slidably supported in a first direction of vehicle collision detection;

a shaft for slidably supporting said weight;

a first stopper for stopping a sliding motion of said weight in said first direction of vehicle collision detection and for supporting a first end of said shaft;

a second stopper for stopping said sliding motion of said weight in a second direction opposite to said first direction of vehicle collision detection and for supporting a second end of said shaft;

an elastic means for providing a force acting on said weight in said second direction opposite to said first direction of vehicle collision detection;

a movable contactor which contacts said weight at least when said sliding motion of said weight in said second direction is stopped by said second stopper;

a fixed contactor provided on said second stopper; and a base integrally formed with said second stopper, wherein an extending portion of said base extends along at least a substantial length of said shaft in a longitudinal direction which is substantially parallel to a longitudinal axis of said shaft, wherein said extending portion of said base has a pair of side walls which are parallel to said longitudinal axis of said shaft and which form a receiving portion between said side walls, and wherein said first stopper comprises a seat which is press-fitted into said receiving portion of said base to secure said first stopper to said base.

2. A collision detecting device as claimed in claim 1, wherein a bottom surface of said seat contacts an upper surface of said extending portion after said seat is press-fitted into said receiving portion.

3. A collision detecting device as claimed in claim 2, wherein said side walls have first protrusions which contact an upper surface of said seat to maintain said bottom surface of said seat in contact with said upper surface of said extending portion.

4. A collision detecting device as claimed in claim 1, wherein a first side wall of said side walls comprises at least one first protrusion, wherein a second side wall of said side walls comprises at least one second protrusion, wherein a first seat side of said seat comprises a plurality of first seat recesses, wherein a second seat side of said seat comprises a plurality of second seat recesses, wherein a relative distance between said first stopper and said second stopper can be accurately obtained by selectively engaging said at least one first protrusion with a particular first seat recess of said first seat recesses and selectively engaging said at least one second protrusion with a particular second seat recess of said second seat recesses.

5. A collision detecting device as claimed in claim 1, wherein a first side wall of said side walls comprises a plurality of first recesses, wherein a second side wall of said side walls comprises a plurality of second recesses, wherein a first seat side of said seat comprises at least one first seat protrusion, wherein a second seat side of said seat comprises at least one second seat protrusion, wherein a relative distance between said first stopper and said second stopper can be accurately obtained by selectively engaging said at least one first seat protrusion with a particular first recess of said first recesses and selectively engaging said at least one second seat protrusion with a particular second recess of said second recesses.

6. A collision detecting device as claimed in claim 1, wherein said shaft is formed of one of a metal having a surface being processed to be lubricous and a metal being lubricous in itself in order to reduce friction between said shaft and said weight when said weight contacts said shaft.

7. A collision detecting device, comprising:

a weight slidably supported in a first direction of vehicle collision detection;

a shaft for slidably supporting said weight, wherein said shaft comprises a recess;

a first stopper for stopping a sliding motion of said weight in said first direction of vehicle collision detection and for supporting a first end of said shaft;

a second stopper for stopping said sliding motion of said weight in a second direction opposite to said first direction of vehicle collision detection and for supporting a second end of said shaft, wherein said second stopper comprises a protrusion;

an elastic means for providing a force acting on said weight in said second direction opposite to said first direction of vehicle collision detection;

a movable contactor which contacts said weight at least when said sliding motion of said weight in said second direction is stopped by said second stopper;

a fixed contactor provided on said second stopper; and a base integrally formed with said second stopper, wherein said protrusion of said second stopper is inserted into said recess of said shaft when said shaft is held by said second stopper.

8. A collision detecting device, comprising:

a weight slidably supported in a first direction of vehicle collision detection;

a shaft for slidably supporting said weight, wherein said shaft comprises at least one of a groove and a T-shaped portion provided at a first shaft end of said shaft;

a first stopper for stopping a sliding motion of said weight in said first direction of vehicle collision detection and for supporting a first end of said shaft;

a second stopper for stopping said sliding motion of said weight in a second direction opposite to said first direction of vehicle collision detection and for supporting a second end of said shaft;

an elastic means for providing a force acting on said weight in said second direction opposite to said first direction of vehicle collision detection;

a movable contactor which contacts said weight at least when said sliding motion of said weight in said second direction is stopped by said second stopper;

a fixed contactor provided on said second stopper; and a base integrally formed with said second stopper, wherein said shaft is securely held by said second stopper by insert-molding said at least one of said groove and said T-shaped portion into said second stopper.

9. A collision detecting device as claimed in claim 8, wherein said at least one of said groove and said T-shaped portion is said T-shaped portion.

10. A collision detecting device as claimed in claim 8, wherein said at least one of said groove and said T-shaped portion is said groove.

11. A collision detecting device comprising:

a weight slidably supported in a first direction of vehicle collision detection;

a shaft for slidably supporting said weight;

a first stopper for stopping a sliding motion of said weight in said first direction of vehicle collision detection and for supporting a first end of said shaft;

a second stopper for stopping said sliding motion of said weight in a second direction opposite to said first direction of vehicle collision detection and for supporting a second end of said shaft;

an elastic means for providing a force acting on said weight in said second direction opposite to said first direction of vehicle collision detection;

a movable contactor which contacts said weight at least when said sliding motion of said weight in said second direction is stopped by said second stopper;

a fixed contactor provided on said second stopper; and a base integrally formed with said second stopper, wherein an extending portion of said base extends along at least a substantial length of said shaft in a longitudinal direction which is substantially parallel to a longitudinal axis of said shaft, wherein said extending portion of said base extends along substantially all of said length of said shaft in said longitudinal direction, wherein said extending portion of said base has a pair of side walls which are parallel to said longitudinal axis of said shaft and which form a receiving portion between said side walls, and wherein said first stopper comprises a seat which is press-fitted into said receiving portion of said base to secure said first stopper to said base.

* * * * *